May 2, 1967 V. MILEWSKI 3,316,616

ELBOW TILT PIN RETAINER

Filed July 19, 1966

INVENTOR
VICTOR MILEWSKI
BY Farley, Forster
and Farley
ATTORNEYS 3,316,616
ELBOW TILT PIN RETAINER
Victor Milewski, Birmingham, Mich., assignor to The Valeron Corporation, a corporation of Michigan
Filed July 19, 1966, Ser. No. 566,432
9 Claims. (Cl. 29—96)

This invention relates to cutting tools using disposable carbide and like cutting inserts and, more particularly, to a new and improved means of retaining the inserts securely seated on such tools.

Various tilt and clevis pin arrangements are known for securely holding and making replaceable cutting inserts used with certain cutting tools. Generally, a threaded means operates a pin directly engaging the insert. Normally, it is located on an end or side face of the tool and immediately adjacent the cutting insert. This often requires added clearance for such means on the tool head. It also means that the tool must be turned over or around to change or index the cutting insert and often makes any change while the tool is mounted for use very difficult.

This invention is directed to a tilt pin arrangement where the pin is bent or formed to include an elbow bend, and wherein two separate and cooperative parts are used to actuate it. This provides for extra clearance under the cutting insert and enables the actuating screw to be accessible on the same face of the tool as the cutting insert or elsewhere as desired. The advantages of such an arrangement are obvious and will best be known and appreciated in the description of a preferred embodiment of this invention which follows hereinafter.

Figure 1:
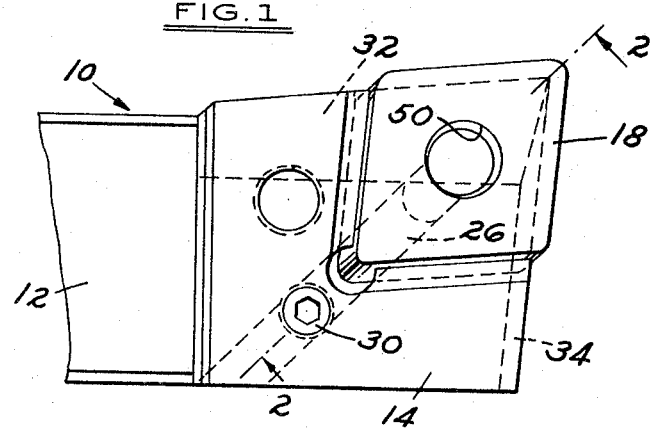
FIG. 1 is a side elevational view of a cutting tool incorporating the features of this invention.
Figure 2:
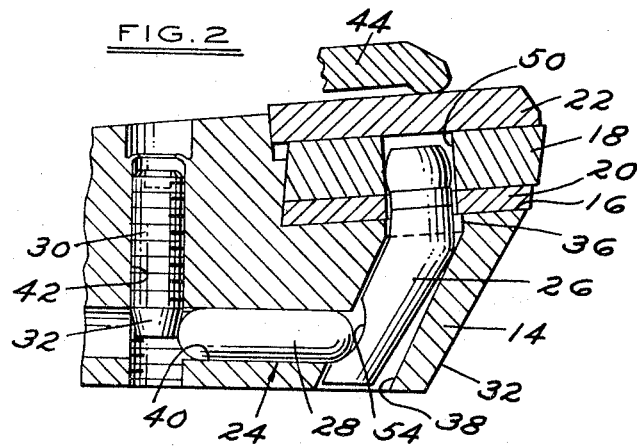
FIG. 2 is a cross-sectional view of the cutting tool of the first drawing figure as seen in the plane of line 2—2 thereon.
Figure 3:
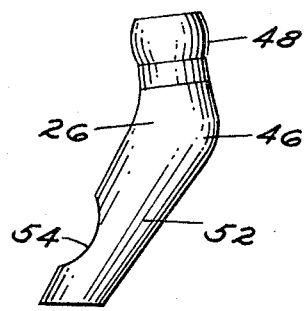
FIG. 3 is a detailed view of the bent tilt pin member by itself.

The cutting tool 10 is shown to include a shank or holder part 12 and to include a tool head 14. Within the tool head 14 is provided a seat 16 to receive the cutting insert 18 and a shim seat member 20. A chip breaker member 22 is received over the cutting insert 18 as shown in FIG. 2. The chip breaker member is not shown in the first drawing figure to avoid obscuring other features to be discussed.

The tilt pin arrangement 24 of this invention includes a bent tilt pin 26, an intermediate part 28 and a screw threaded means 30 having a cone point 32.

By turning the screw means 30, the tilt pin 26 is moved to hold the cutting insert 18 securely in place for use or to release it so that the insert may be indexed or replaced.

Referring to the drawings and the different parts in further detail:

The tool head 14 is under-cut as at 32 and 34 relative to the cutting insert seat 16. An angular bore provided by connecting passages 36 and 38 is formed in the tool head centrally through the insert seat. Within this angular bore passage is disposed the tilt pin 26.

A bore hole passage 40 is formed diagonally through a side wall of the tool head to intercept the angular bore passage near its lower end. Within this passage is disposed the intermediate part 28.

The screw threaded means 30 is provided in a threaded passage 42 spaced relative to the tilt pin passages and disposed normal to the last mentioned passage 40 retaining the intermediate part 28.

The insert seat 16 includes beveled side walls formed to mate with like beveled side walls of the cutting insert members 18. This also provides a corner pocket for more secure engagement of the insert, as commonly known.

The cutting insert 18 is positioned on the receptive seat 16 in the corner pocket provided on the shim seat member 20 of whatever thickness is desired. The chip breaker block 22 is disposed over the cutting insert and held by a clamp means 44 in the conventionally known manner. However, the cutting insert 18 and the shim seat member 20 are held together on the seat by the tilt pin arrangement 24 which will now be described in further detail.

The tilt pin 26 is bent or otherwise formed to include an elbow bend 46 and is generally shaped to fit the angular bore provided by the connecting passages 36 and 38 with reasonable clearance for its intended purpose. It has a bulbular end 48 which is received in a center bore 50 provided in the cutting inserts 18. The pin is formed for elbow engagement with the far wall of the bore passage 38 relative to the corner pocket seat in which the insert is retained. The lower end 52 of the pin is tapered and formed to include a cavity 54 receptive of the end of the intermediate pin part 38 for engagement therein.

The intermediate pin part 28 is reciprocal in the bore passage 40 and is held in engagement with the tilt pin by the cone tip screw 30 to both actuate the tilt pin and keep it from falling out of the angular bore in which disposed.

When the tilt pin is urged toward the far wall of the angular bore passage, it seats and holds the cutting insert 18 in the corner pocket of the receptive seat 16 provided on the cutting tool. It will be appreciated that the retaining force provided by the tilt pin is both towards the corner pocket area and down into the receptive seat 16 by virtue of the elbow bent shape of the tilt pin member.

When the actuating screw 30 is backed off, the tilt pin 26 is held loosely in the angular bore and the cutting insert 18 can be removed, indexed or replaced as desired.

With the actuating end or head of the retaining screw 30 on the same side of the tool head as the insert, it will be appreciated that changing the insert is easier since the holder does not have to be turned over. It will also be appreciated that the actuating screw may be located on any of the different side faces of the tool head, and at a greater distance back from the insert, and still be normal to the bore passage 40, within which is provided the intermediate member 28, and capable of serving its intended purpose.

Without further discussion, it will be appreciated that a preferred embodiment of this invention has been shown and described but that certain modifications and improvements are forseeable within the scope of what has been said. Accordingly, such of these improvements and modifications as are not specifically excluded by the language of the hereinafter appended claims are to be considered as inclusive thereunder.

I claim:

1. A cutting tool comprising a tool head formed to provide a shouldered seat and having a replaceable cutting insert with a central hole therein received and disposed for use thereon, a bore hole provided in said tool head centrally of said seat and having an elbow shaped tilt pin received therein extending into said insert hole for engaging and retaining said insert against the shoulder on said seat, a reaction surface in said bore hole adapted for engagement by an intermediate elbow portion of said tilt pin, and means for actuating the end of said tilt pin remote from said insert.

2. The cutting tool of claim 1, said last means comprising passage means provided normal to said bore hole and having means therein operative of said tilt pin, and screw threaded means provided in spaced relation to said bore hole and normal to said passage means for operative engagement with said tilt pin operative means.

3. The cutting tool of claim 2, said tilt pin and the means operative thereof being separate parts and having means of cooperative engagement provided therebetween.

4. The cutting tool of claim 2, said screw threaded means being accessibly exposed on the side of said tool head formed to provide said seat.

5. The cutting tool of claim 4, said means operative thereof being a separate part formed for cooperative engagement with the lower disposed end thereof.

6. The cutting tool of claim 5, said means operative of said tilt pin having opposite ends similarly formed and said screw threaded means and tilt pin being formed for complementing engagement therewith.

7. The cutting tool of claim 6, said tilt pin being formed to receive the means operative thereof in retaining engagement therewith precluding inadvertent removal of said pin from said bore hole.

8. A cutting tool comprising a tool head formed to provide a shouldered seat on a side face thereof and having a replaceable cutting insert with a central hole therein received and disposed for use thereon, an angular bore hole provided in said tool head from centrally of said seat and inclined rearwardly, a tilt pin received in said angular bore hole having a head extending into said insert hole and including an elbow bend intermediate the ends thereof, a reaction surface in said bore hole adapted for engagement by said tilt pin at said elbow bend, a transverse bore provided in said tool head relative to and intersecting said angular bore hole, a member provided in said transverse bore for longitudinal movement and operative engagement with said tilt pin in said angular bore hole, and a cone screw provided in said tool head for actuating engagement with said member in said transverse bore operative of said tilt pin and for holding said insert against the shoulder on said seat via said tilt pin.

9. The cutting tool of claim 8, said cone screw being accessible on the side face of said tool head formed to provide said seat.

References Cited by the Examiner

UNITED STATES PATENTS

| | | | |
|---|---|---|---|
| 3,137,059 | 6/1964 | Hertel | 29—96 |
| 3,146,656 | 9/1964 | Richards | 29—96 X |
| 3,154,974 | 11/1964 | Greenleaf | 29—96 X |
| 3,226,797 | 1/1966 | Hertel | 29—96 |
| 3,238,600 | 3/1966 | Milewski | 29—96 |

WILLIAM W. DYER, JR., *Primary Examiner.*

HARRISON L. HINSON, *Examiner.*